July 29, 1958
H. S. KUHN
2,845,283
VARIABLE LENGTH JOINT WITH BALLS AND
SOCKETS FOR UNIVERSAL MOVEMENT
Filed Nov. 3, 1954
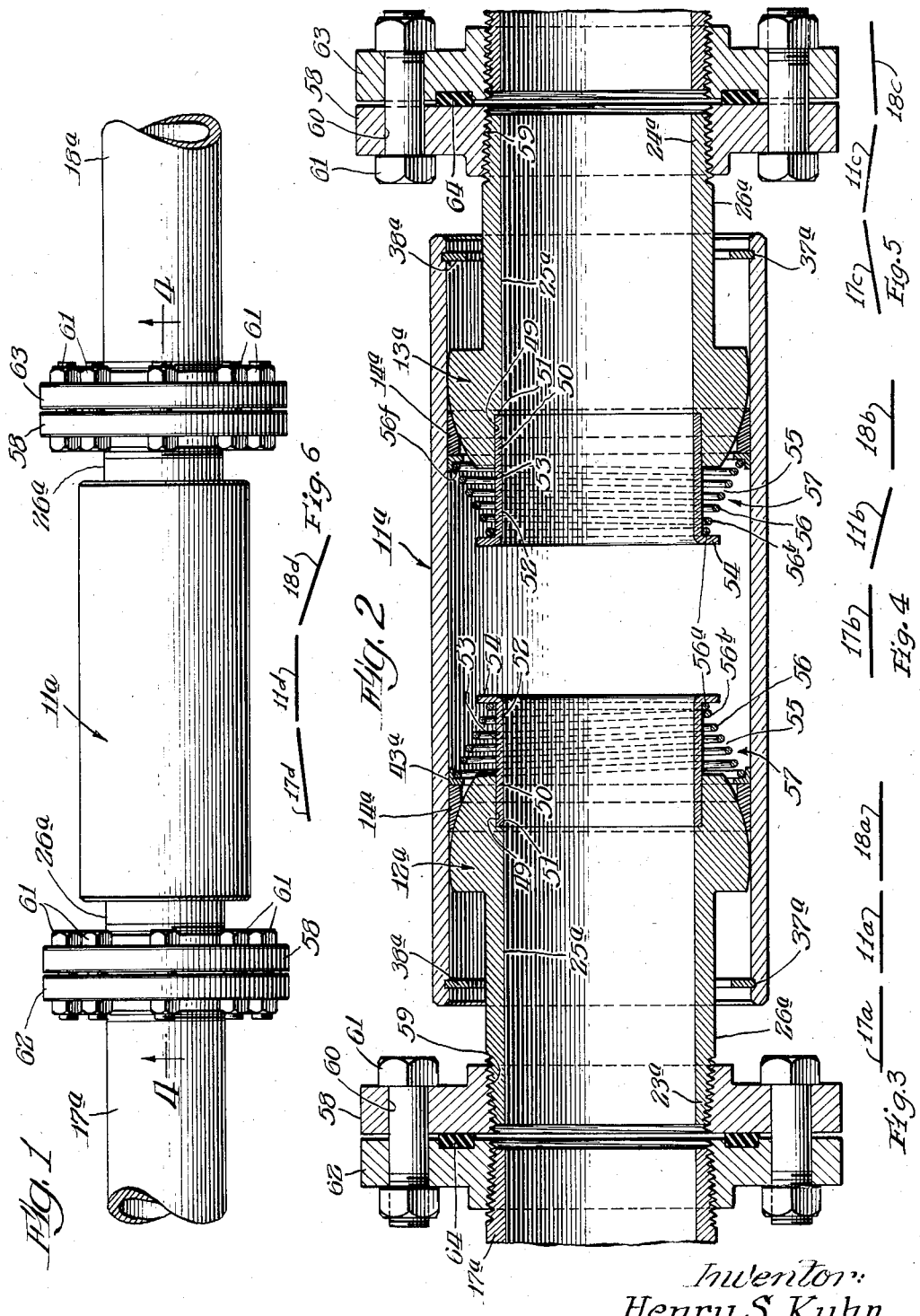
Inventor:
Henry S. Kuhn
By Robert H. Wendt Atty.

United States Patent Office 2,845,283
Patented July 29, 1958

2,845,283

VARIABLE LENGTH JOINT WITH BALLS AND SOCKETS FOR UNIVERSAL MOVEMENT

Henry S. Kuhn, Park Ridge, Ill., assignor to Rotherm Engineering Company, Inc., Chicago, Ill., a corporation of Illinois Application November 3, 1954, Serial No. 466,608

1 Claim. (Cl. 285—166)

The present invention relates to variable length joint with balls and sockets for universal movement for joining a pair of rigid pipes or the like and providing a fluid-tight and liquid-tight joint which is adapted to permit expansion, misalignment and various other defects with a minimum amount of strain in the pipes.

The expansion joints of the prior art with which I am familiar are only adapted to permit longitudinal expansion or contraction of the rigid pipes which they join, and are not adapted to relieve strains caused by the misalignment of the ends of the rigid pipes or the lateral displacements of the axes of the rigid pipes.

One of the objects of the invention is the provision of improved expansion joints for providing a fluid-tight and liquid-tight joint between two adjacent rigid conduits which permits the ends of the conduits to move longitudinally of the axes of the conduits, and also permits lateral flexibility or movements in other directions, thus relieving piping strains in the rigid pipes.

Another object of the invention is the provision of an improved expansion joint which automatically maintains a fluid-tight and liquid-tight joint between two rigid pipes without requiring any packing of the ordinary type usually employed in expansion joints.

Another object of the invention is the provision of improved expansion joints which are automatically sealed during or after any longitudinal movement between the ends of the rigid pipes which they join, and which are provided with resilient means for automatically maintaining the sealing action.

Another object of the invention is the provision of improved expansion joints, permitting flexible action as well as expansion, which do not require a bellows and in which the seal will not adhere to the metal.

Another object of the invention is the provision of improved expansion joints adapted to be used to permit the general expansion and contraction of all rigid steel, hydraulic, and air lines to relieve piping strains on walls, bulk heads, valves, and tanks and eliminate all piping breakage.

Other objects and advantages of the invention will be apparent from the following description and the accompanying drawings, in which similar characters of reference indicate similar parts throughout the several views.

Referring to the drawings accompanying this specification, of which there is one sheet, Fig. 1 is a side elevational view of a preferred form of expansion joint joining two rigid conduits which are provided with flanged fittings;

Fig. 2 is a sectional view taken on the plane passing through the axis of the joint of Fig. 1;

Figs. 3, 4, 5 and 6 are line diagrams which are exemplary of the various types of misalignment which may be encountered in joining rigid pipes.

Referring to Figs. 1 and 2, the expansion joints 10a, illustrated in these figures, preferably include a tubular housing 11a, a pair of threaded ball fittings 12a and 13a slidably and rotatably mounted in said housing, a pair of wedge-shaped annular seals 14a, 15a, engaging between the ball fittings and the housing, and resilient means 57 for urging the wedge seals into sealing position.

The assembly which embodies such an expansion joint also includes a pair of rigid pipes 17a and 18a, each of which has a threaded end 19a and 20a, respectively, to be joined by a flange fitting 21a or 22a to the threaded fittings 12a and 13a.

Referring to Figs. 3, 4, 5 and 6, these are line diagrams showing the axes of the rigid pipes 17a and 18a and the joint housing 11a, exemplifying various types of misalignment.

In Fig. 3 the axis 17a of the pipe 17 is shown in axial alignment with the pipe 18a and joined by the joint unit 11a, which is in alignment with both of them. This situation is never encountered in actual practice.

In Fig. 4 the axis of one pipe 17b is parallel to but out of alignment with the axis 18b of the other pipe, and this involves the location of the axis 11b of the joint housing in a diagonal direction extending from one fitting to the other.

In Fig. 5 the one pipe 17c extends diagonally upward at one angle, while the other pipe 18c extends diagonally in the same direction but at a different angle, and this requires the joint 11c again to extend diagonally between the ends of the fittings.

Another situation is illustrated in Fig. 6, where the axis 17d extends diagonally upward and the axis 18d extends diagonally downward, and the ends are joined by the expansion joint housing 11d.

Pipe threads are notoriously out of alignment and may be laterally displaced with respect to the axis of the pipe or fitting on which they are located, because pipe threads are cut by a die which follows its own threads and the threads are cut deeper wherever the pipe is softer and shallower where the pipe is harder.

Thus pipe 17, when joined by means of coupling 21 or a union to a fitting 12 by means of the threaded end portions 19 and 23 are sure to be out of axial alignment with each other, that is, the axis of the pipe 17 is out of alignment with the axis of the fitting 12.

The same will be true of the alignment or rather misalignment between the rigid pipe 18 and the fitting 13, which has pipe threads 24.

It should be understood that the pipes 17 and 18 are merely the ends of a long system of piping which may extend in all kinds of different directions, being provided with elbows of various angularity, so that when the rigid pipes extend and the expansion or contraction is translated to the ends 17 and 18 of the pipe, these ends mays move in almost any direction as well as moving toward each other during expansion, and away from each other during contraction.

The present joints are adapted to take care of all of these movements of the ends of the pipes and at the same time maintain a liquid-tight, and fluid tight joint for transmission of steam, hydraulic fluid, air or liquids at any desired temperature without producing strains in the piping systems.

For this reason each of the fittings 12, 13 may comprise a tubular metal member having a through conduit 25, extending through the fitting, and having an external cylindrical surface 26, except at the threaded ends 23 and 24.

Each fitting 12, 13 is provided with a partially ball shaped or partially spherical head 27, which extends from an annular shoulder 28 forwardly to the annular end 29 of the fitting.

The annular, partially spherical surface 30 of this ball head on each fitting 12 and 13 has sufficient curvature, or extends over sufficient of the surface of a sphere so that it curves inwardly from the inside of housing 11 to the point 31, and also curves inwardly to the point 32 at its end, thus permitting a definite angular amount of deflection between the axis of the fitting and the axis of the housing, while still having a spherical surface disposed toward the inside of the housing at all times.

The housing 11 comprises a cylindrical metal tube having an outer cylindrical surface 33 and an inner cylindrical bore 34; and the housing is of sufficient length so that it extends backwardly upon each of the heads 27 on the shank or cylindrical portion 26 of each fitting, leaving a free space 35 at each end inside the tube for withdrawal of the head on contraction of the rigid pipes.

The size of the heads 27, that is their maximum diameter, is slightly less than the inside diameter of the bore 34 in the housing 11, as the fluid-tight seal is not to be accomplished by the metal-to-metal contact.

The length of the housing 11 is such and the pipes 17 and 18 are sufficiently spaced so that there is an open expansion space inside the housing 11, between the two balls 27, to permit the fittings to move toward each other on expansion of the rigid pipes 17 and 18.

In order to make sure that the joint housing 11 cannot slide off the ball fittings 12, 13, housing 11 is provided adjacent each end with an annular groove 36, preferably of rectangular cross section, and adapted to receive the outer edge of a split annular member 38, which is also preferably rectangular in cross section, fitting in the groove 36, in which it is held by the outward resilient spring action of the ring 38 in each case.

The radial dimension of each ring 38 is such that the inner edge 37 of the annular member extends inside the edge of the annular rear surface 28 of each head; thus the back edge of each head will engage a ring 38 in the housing 11, if the housing slides too far in either direction off one head or the other.

Each ball 27 is separated at its spherical surface 30 from the cylindrical surface 34 of the housing bore by wedge shaped annular seals 14 and 15.

This seal has an outer cylindrical surface 39, an annular plane surface 40 at its end, and an inner partially spherical surface 41; and each tapers to a sharp annular edge 42 so that the seal 14 fits closely between the ball surface of the cylindrical surface of the housing 11.

Each seal is preferably engaged by an annular metallic spring seat 43, which is a metal ring having a cylindrical flange 44 and a radial flange 45.

The radial flange 45 is wide enough to cover the plane end 40 of the seal 14, and the cylindrical flange 44 is slightly smaller on its outside than the bore 34 for a free sliding fit.

A helical coil spring 46, having uniform circular turns 47, spaced from each other by the spaces 48, has each of its ends seated in one of the annular metal seats 43.

The spring 46 is under sufficient compression so that it will expand and exert pressure on both of the seals 14 and 15, by means of the spring seats 43, when the ball heads 27 have moved apart even to the maximum distance.

The seals 14, 15 are preferably made out of a plastic compound, sold on the market under the name "Teflon," which is made of a plastic material, polyethyltetrafluoride, also known as tetrafluoroethylene.

This wedge seal is so thin that it possesses the characteristic of stretching or expanding when it is pressed over the partially spherical surfaces 30 of the two ball heads; and the seal also has the characteristic that it does not adhere to metal while still providing a liquid-tight and fluid-tight joint under high or low temperatures.

The housing 11 and ball fittings 12, 13 may be made out of any suitable metal, such as iron, steel, brass, copper, stainless steel, aluminum alloys or various alloys having a hard, smooth external finish, and adapted to resist the action of the fluids or liquids with which the joint is to be used.

The spring 46 and spring seats 43 may be made of steel, stainless steel or various non-corroding resilient alloys.

The operation of the expansion joint is as follows:

The rigid pipes 17 and 18, which represent the ends of a pair of relatively rigid pipe systems, including valves, tanks, etc., are so located that they are in approximate alignment, so that their end axes extend in substantially the same direction.

When the pipe systems expand the end pipes 17 and 18 may move toward each other, causing the heads and the "Teflon" seals 14 and 15 to slide in the housing 10, while maintaining a fluid-tight joint.

Simple longitudinal movement of the fittings 12 and 13 toward each other is the exception rather than the rule, and the present joint permits each ball fitting 12 or 13 to tilt in any direction, while the ball surface 30 slides against the ball surface 41 of the "Teflon" wedge, still maintaining a fluid-tight joint.

Upon contraction of the pipe systems in colder weather or from lack of heat from the fluids that have been removed, the balls 27 recede from each other and again may tilt in any direction that is necessary to relieve strains in the pipe systems which include the pipes 17 and 18.

Referring to Figs. 1 and 2, these are views showing a preferred device secured to a rigid pipe system by means of flanged fittings. This device includes similar parts which have been given corresponding numerals with an "a" suffix.

For example, the two ball fittings 12a and 13a may be similar in construction, except that each is provided with an enlarged counterbore 49 in the ball end of the bore 25a for receiving and frictionally holding a steel tube 50, which acts as a spring seat and is pressed into the counterbore 49 against the annular shoulder 51.

The steel tube 50 has a cylindrical bore 52 and a cylindrical outer surface 53, and has its inner end provided with a radial flange 54.

The length of the tube 50 is sufficient to accommodate the amount of spring required and to still leave spaces 55 between the successive coils 56 of the spring 57, which in this case is a spring of approximately conical outline. This is, the innermost coils 56a fit about the tube 50 against the radial flange 54; but each successive coil 56b, etc., is slightly larger until the last coil 56f fits in the annular ring 43a, which engages the wedge seal 14, both of which are similar in construction to the joint previously described.

The housing 11a is similar to that previously described and is provided with spring rings 38a, located in grooves 37 in the ends of housing 11a to keep the housing from sliding off the heads. Thus each ball fitting is provided with its own spring for urging the wedge seal constantly into sealing position in this modification.

The threaded ends 23a and 24a of the ball fittings are in this case threaded into flange fittings 58. Each flange fitting has a complementary bore provided with pipe threads 59 for receiving the threaded ends 23a or 24a, and each flange member has a plurality of regularly spaced holes 60 for receiving the bolts 61, by means of which the flange fitting is bolted to another flange 62 or 63.

The flanges 62 and 63 are adapted to receive threaded pipes of a rigid pipe system and a suitable gasket 64 may be interposed between the two flanged members 58 and 62, 58 and 63.

The operation of this modification is similar to that previously described, except that this modification is supposed to be used for the larger types of pipe that are joined together by flange fittings.

It will thus be observed that I have invented improved expansion joints for use with rigid pipe systems that permit the rigid pipe systems to which they are connected to expand and contract without inducing strains in the pipe systems; and the pipes that are joined by the present joints are not held in alignment but are permitted to move within certain limits in any angular or eccentric way, while still maintaining a liquid-tight and fluid-tight joint between the two pipe systems.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A liquid-tight and gas-tight extensible and universally movable expansion joint assembly, comprising a cylindrical metal housing tube of sufficient length to provide an extension space at each of its ends, said housing tube having a cylindrical bore open at both ends, and having an inner peripheral groove of rectangular cross section adjacent each end, a flat, resilient, split metal ring expanded into each of said grooves and presenting a wide inner stop surface in each end of said bore, a tubular metal fitting in each end of said bore, and comprising an outwardly extending tube with an outer threaded end, said tube having an outer diameter smaller than the inner diameter of the split ring in each case, and having a through bore communicating with the bore in the other fitting through said housing tube, each fitting having on its inner end a partially spherical enlargement having a radial outer surface facing toward said split ring in each case, but spaced therefrom, said enlargement having an annular partially spherical convex surface engaging universally the inner bore of said housing tube, said spherical surface being formed on a relatively large radius, providing a narrow, sharply tapered groove between the enlargement and the housing tube bore at the inner end of each fitting, each fitting having a larger counterbore at its inner end, a metal spring supporting tube having a tight frictional fit in the counterbore in each fitting, and extending inwardly in each case, and having a radial flange projecting outwardly at the inner end of each spring supporting tube, a narrow annular packing ring of "Teflon," having a cylindrical outer surface engaging the wall of the bore of the housing tube, and having an inner, annular, concave, partially spherical surface engaging the spherical enlargement of each fitting, and tapered outwardly to a V-shaped edge complementary to the annular groove about each spherical enlargement, each packing ring having an inner plane radial surface at its inner end, an annular metal seating ring having a radial flange engaging the inner plane surface of each packing ring, and having a cylindrical flange forming a spring seat, and slidably mounted in the cylindrical bore of said housing tube, and a tapered coil spring having its larger end engaging in said spring seating ring, and its smaller end engaging the radial flange of said spring supporting tube, about which said coil spring is located, said spring acting on said packing ring in each case, and reacting on said radial flange to drive each packing ring into sliding sealing engagement with the inside of said housing tube and the outside of said spherical enlargement independently of the other spring and packing ring.

References Cited in the file of this patent

UNITED STATES PATENTS

| | | |
|---|---|---|
| 930,071 | Greenlaw | Aug. 3, 1909 |
| 1,560,735 | Russell | Nov. 10, 1925 |
| 1,639,800 | Gillick | Aug. 23, 1927 |
| 1,703,876 | Farmer | Mar. 5, 1929 |
| 2,222,612 | Goff | Nov. 26, 1940 |
| 2,627,429 | Engelman | Feb. 3, 1953 |
| 2,726,104 | Boitnott | Dec. 6, 1955 |

FOREIGN PATENTS

| | | |
|---|---|---|
| 578,037 | France | June 20, 1924 |
| 699,369 | France | Dec. 9, 1930 |
| 200,430 | Switzerland | Dec. 16, 1938 |